(12) United States Patent
Dennis et al.

(10) Patent No.: US 8,479,044 B2
(45) Date of Patent: Jul. 2, 2013

(54) METHOD FOR DETERMINING A STATE ASSOCIATED WITH A TRANSACTION

(75) Inventors: Paul S. Dennis, Hursley Park (GB); Stephen J. Hobson, Hursley Park (GB); Pete Siddall, Hursley Park (GB); Jamie P. Squibb, Hursley Park (GB); Phillip G. Willoughby, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 344 days.

(21) Appl. No.: 12/841,318

(22) Filed: Jul. 22, 2010
(Under 37 CFR 1.47)

(65) Prior Publication Data
US 2011/0055628 A1    Mar. 3, 2011

(51) Int. Cl.
    *G06F 11/00* (2006.01)
(52) U.S. Cl.
    USPC ............... 714/15; 714/16; 714/18; 714/19; 714/21; 718/101
(58) Field of Classification Search
    USPC .................. 714/15, 16, 18, 19, 21; 718/101
    See application file for complete search history.

(56) References Cited

U.S. PATENT DOCUMENTS

| | | | |
|---|---|---|---|
| 6,052,695 A * | 4/2000 | Abe et al. | 1/1 |
| 6,687,709 B2 * | 2/2004 | Williams | 707/704 |
| 6,965,893 B1 * | 11/2005 | Chan et al. | 1/1 |
| 7,100,076 B2 * | 8/2006 | Johnson et al. | 714/13 |
| 7,260,589 B2 * | 8/2007 | Cotner et al. | 707/684 |
| 7,694,178 B2 * | 4/2010 | Hobson | 714/16 |
| 7,725,432 B2 * | 5/2010 | Barnes et al. | 707/611 |
| 7,743,036 B2 * | 6/2010 | Cotner et al. | 707/674 |
| 7,900,085 B2 * | 3/2011 | Little | 714/10 |
| 7,996,837 B2 * | 8/2011 | Chesebro et al. | 718/100 |
| 8,001,546 B2 * | 8/2011 | Felt et al. | 718/101 |
| 8,127,175 B2 * | 2/2012 | Parkinson | 714/15 |
| 2003/0154423 A1 * | 8/2003 | Egolf et al. | 714/15 |
| 2004/0225915 A1 * | 11/2004 | Johnson et al. | 714/13 |
| 2004/0236989 A1 * | 11/2004 | Pavlik et al. | 714/15 |
| 2005/0015353 A1 * | 1/2005 | Kumar et al. | 707/1 |
| 2007/0043784 A1 * | 2/2007 | Parkinson | 707/202 |
| 2007/0239719 A1 * | 10/2007 | Cotner et al. | 707/8 |
| 2008/0040717 A1 * | 2/2008 | Hobson | 718/101 |
| 2008/0235295 A1 | 9/2008 | Parkinson | |
| 2009/0235255 A1 * | 9/2009 | Hu et al. | 718/101 |
| 2010/0017642 A1 * | 1/2010 | Myers | 714/2 |
| 2011/0055835 A1 * | 3/2011 | Dennis et al. | 718/101 |

* cited by examiner

*Primary Examiner* — Joshua P Lottich
(74) *Attorney, Agent, or Firm* — David Mims; Robert C. Rolnik (57) ABSTRACT

A computer implemented method, apparatus, and computer program product for determining a state associated with a transaction for use with a transactional processing system comprising a transaction coordinator and a plurality of grouped and inter-connected resource managers, the method comprising the steps of: in response to a communications failure between the transaction coordinator and a first resource manager causing a transaction to have an in doubt state, connecting to a second resource manager; in response to the connecting step, sending by the transaction coordinator to the second resource manager, a query requesting data associated with the in doubt transaction; obtaining at the first resource manager, by the second resource manager, a shared lock to data associated with the in doubt transaction; and in response to the obtaining step, collating, by the second resource manager, data associated with the in doubt transaction associated with the first resource manager.

9 Claims, 6 Drawing Sheets

METHOD FOR DETERMINING A STATE ASSOCIATED WITH A TRANSACTION

FOREIGN APPLICATION PRIORITY DATA

This application claims benefit of priority of Foreign Patent Application No. GB 09168943.0, filed in the United Kingdom on Aug. 28, 2009, which is herein incorporated by reference.

BACKGROUND OF THE INVENTION

1. Field of the Invention

The present invention relates to a method for determining a state associated with a transaction.

2. Description of the Related Art

In field of transaction processing, a communication protocol (known as two phase commit) is used to coordinate transactions.

Figure 1:
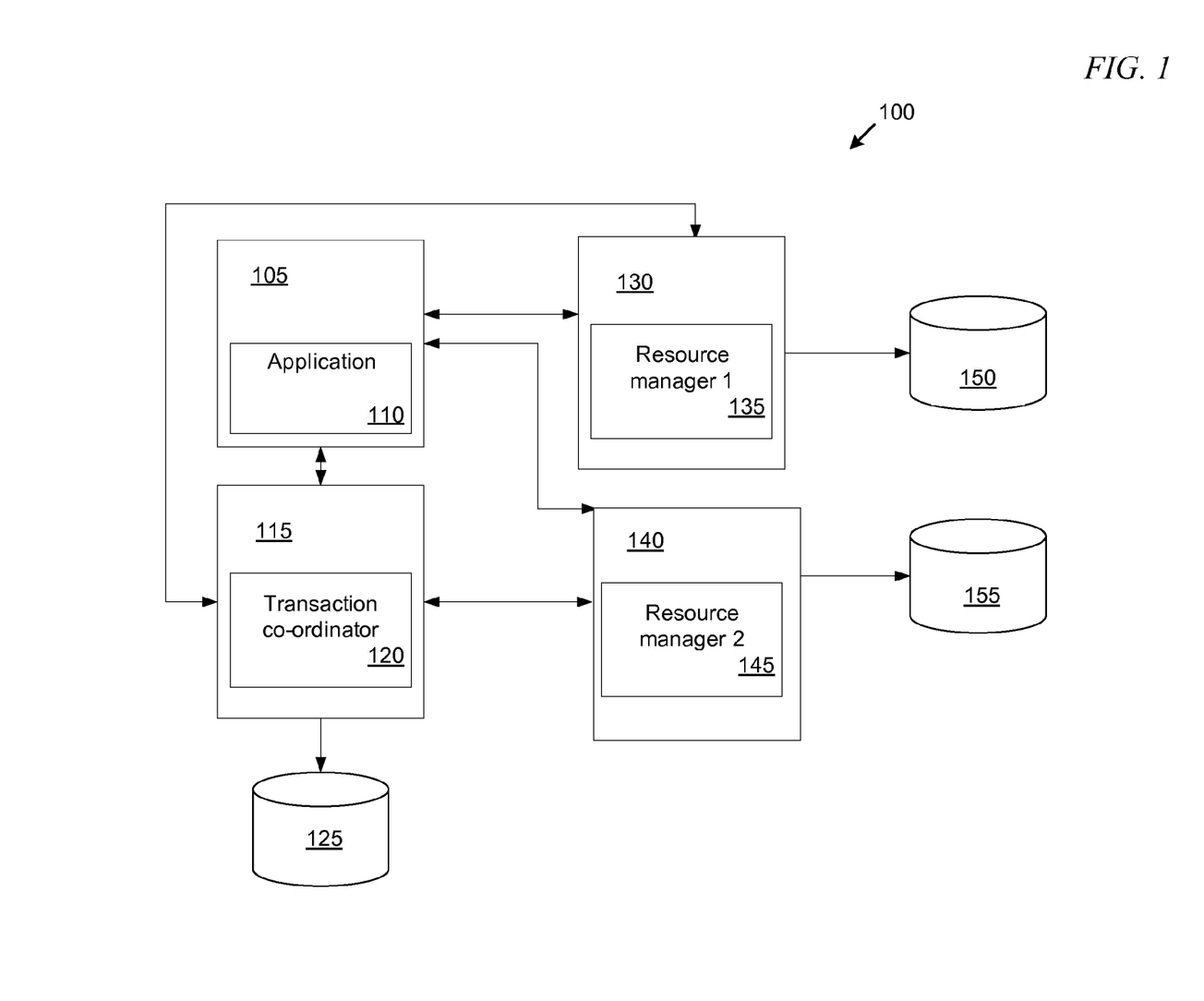
FIG. 1 is a block diagram of a prior art transaction processing system.

FIG. 1 is a block diagram of a transaction processing system 100, wherein a first data processing system 105 comprises an owning application 110 and a second data processing system 115 comprising a transaction coordinator 120 for executing transactions. There is also shown a third data processing system 130 comprising a first resource manager 135 for managing a first resource (e.g. a database). There is also shown a fourth data processing system 140 comprising a second resource manager 145 for managing a second resource (e.g. a database).

The system 100 also comprises a first log, a second log and a third log 125, 150, and 155 to which the transaction coordinator 120, the first resource manager 135, and the second resource manager 145 can respectively write one or more log records (i.e. wherein a log record comprises data associated with a transaction.

When an application wishes to "commit a transaction, the transaction coordinator 120 requests each resource manager involved in the transaction to "prepare".

Following preparation, each resource manager responds to the transaction coordinator that they have prepared to commit the transaction and responsive to receiving the responses, the transaction coordinator 120 asks each of the resource managers to commit the transaction. In response to committing the transaction, each resource manager reports back to the transaction coordinator 120 which subsequently records the transaction as committed.

If a resource manager fails to respond positively to the prepare request, the transaction coordinator 120 issues a "roll-back" decision to the remaining resource managers. In response to rolling back the transaction, each resource manager reports back to the transaction coordinator 120 which subsequently records the transaction as rolled-back.

It should be understood that when a transaction is between the phase where a prepare request has been sent and the phase where the transaction coordinator 120 receives a notification from each resource manager that they have committed (or rolled back) the transaction, the transaction is known as "in doubt".

In environments today, resource managers can be grouped and freely interchangeable such that one resource manager can take over responsibilities of another resource manager in the group. Such an environment allows for high availability in the event of failure of, e.g., the another resource manager, and also allows for load balancing between multiple resource managers, as there can be two or more resource managers which could each perform the work required by a transaction.

In such an environment, there is a need for a mechanism to resolve transactions quickly; without data loss and without requiring significant changes to the transaction processing system.

U.S. Patent Application No. 20080235295, Ser. No. 11/723,274, discloses a system, wherein recovery of in-flowed transactions is provided by any instance in a cluster, along with peer recovery of transactions in a cluster, and administrative functionality related to these aspects. A method of managing transaction processing comprises performing transaction processing using a first process, wherein the first process logs the transaction processing that it performs, detecting failure of the first process, wherein the transaction logs of the first process are locked, taking ownership of the locked transaction logs of the first process at a second process, unlocking the locked transaction logs of the first process for use by the second process, and recovering at least one transaction using the transaction logs.

SUMMARY OF THE INVENTION

The present invention provides a computer implemented method, apparatus, and computer program product for determining a state associated with a transaction for use with a transactional processing system comprising a transaction coordinator and a plurality of grouped and inter-connected resource managers, the method comprising the steps of: in response to a communications failure between the transaction coordinator and a first resource manager causing a transaction to have an in doubt state, connecting to a second resource manager; in response to the connecting step, sending by the transaction coordinator to the second resource manager, a query requesting data associated with the in doubt transaction; obtaining at the first resource manager, by the second resource manager, a shared lock to data associated with the in doubt transaction; and in response to the obtaining step, collating, by the second resource manager, data associated with the in doubt transaction associated with the first resource manager.

According to a second aspect, there is provided an apparatus for determining a state associated with a transaction for use with a transactional processing system comprising a transaction coordinator and a plurality of grouped and inter-connected resource managers, the apparatus comprising: means, responsive to a communications failure between the transaction coordinator and a first resource manager causing a transaction to have an in doubt state, for connecting to a second resource manager; means, responsive to the connecting means, for causing the transaction coordinator to send to the second resource manager, a query requesting data associated with the in doubt transaction; means for causing the second resource manager to obtain, at the first resource manager, a shared lock to data associated with the in doubt transaction; means, responsive to the obtaining means, for causing the second resource manager to collate data associated with the in doubt transaction associated with the first resource manager.

According to a third aspect, there is provided a computer program comprising program code means adapted to perform all the steps of the method above when the program is run on a computer.

BRIEF DESCRIPTION OF THE DRAWINGS

The present invention will now be described, by way of example only, with reference to preferred embodiments thereof, as illustrated in the following drawings.

DETAILED DESCRIPTION OF THE PREFERRED EMBODIMENT

Figure 2:
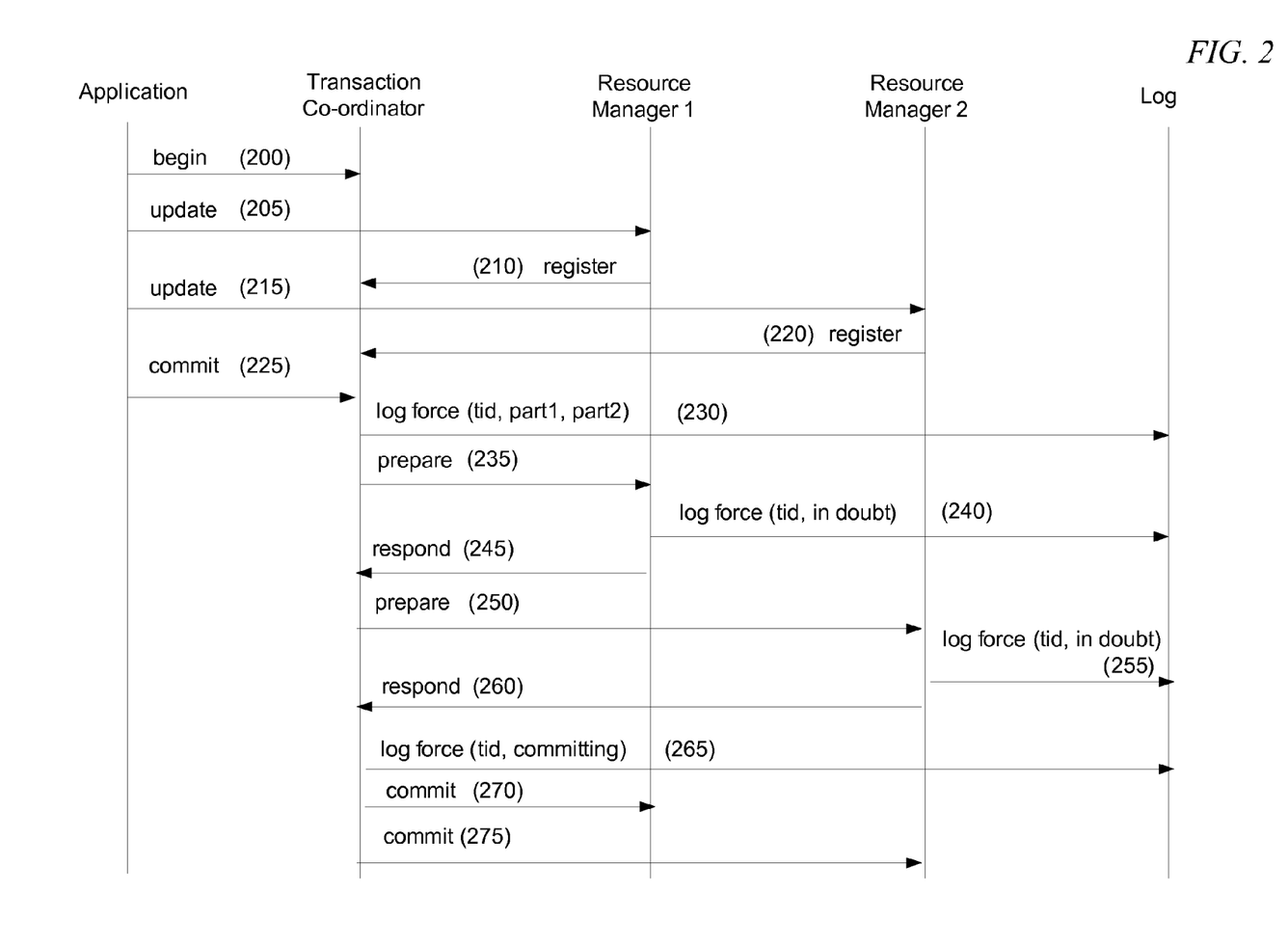
FIG. 2 is a flow chart showing the operational steps involved in a prior art transaction processing process.

FIG. 2 is a schematic diagram of the components involved in an example transaction and the flows involved between the components, according to the prior art, according to a two phase commit protocol.

With reference to FIG. 1 also, firstly, the application 110 flows a begin request 200 to the transaction coordinator 120, which indicates the start of a transaction.

Next, the application 110 sends an update request 205 (that is, a request that makes a change to a resource manager), to the first resource manager 135. In response to receiving the update request, the first resource manager 135 registers 210 as a resource manager in the transaction with the transaction coordinator 120 and receives a transaction identifier of the transaction in response.

Next, the application sends an update request 215 to the second resource manager 145. In response to receiving the update request, the second resource manager 145 registers 220 as a resource manager in the transaction with the transaction coordinator 120 and receives a transaction identifier of the transaction in response.

Note that alternatively to the "dynamic" registration process described, "static" registration can also take place during the begin phase (step 200) (e.g. wherein the transaction coordinator 120 informs each resource manager of the transaction identifier and may or may not involve each resource manager in the transaction).

In response to the first resource manager 135 and the second resource manager 145 successfully performing the update requests, the application 110 sends a commit request 225 to the transaction coordinator 120. The application 110 does not regain control until commit processing completes.

In response to the commit request 225 from the application 110, the transaction coordinator 120 force writes 230 a first log record to its log 125, wherein the first log record comprises an identifier associated with the transaction, an identifier associated with the first resource manager 135 and an identifier associated with the second resource manager 145.

Note that the first resource manager 135 does not have data associated with the second resource manager 145 and vice versa. Thus, only the transaction coordinator has data associated with resource managers in a transaction. Note that a forced write does not return until the data written is hardened to non-volatile storage.

Next, once the forced log write completes (guaranteeing that the data is stored in non-volatile storage), the transaction coordinator 120 flows a prepare request 235 to the first resource manager 135. It should be understood that a resource manager, after being involved in the transaction, assumes rollback until it receives a prepare request. In other words if the resource manager chooses to take unilateral action for the transaction, after being involved in a transaction and before receiving a prepare request, it should rollback updates associated with the transaction.

In response to receiving the prepare request, the first resource manager 135 force writes 240 a second log record to its log 150, wherein the second log record comprises the transaction identifier received in response to the register request and a state associated with the transaction, namely, "in doubt". This state indicates that the first resource manager 135 can no longer assume rollback but needs to wait to be informed of a transaction outcome.

Next, the first resource manager 135 sends 245 a response to the prepare request to the transaction coordinator 120, indicating that the first resource manager 135 can successfully participate in the transaction. It should be understood, that if the first resource manager 135 cannot successfully participate in the transaction, it should roll back any updates it performed and send a rollback response.

Next, the transaction coordinator 120 flows a prepare request 250 to the second resource manager 145. In response to receiving the prepare request, the second resource manager 145 force writes 255 a third log record to its log 155, wherein the third log record comprises the transaction identifier and a state associated with the transaction, namely, "in doubt". This state indicates that the second resource manager 145 can no longer assume rollback but needs to wait to be informed of the transaction outcome.

Next, the second resource manager 145 sends 260 a response to the transaction coordinator 120, indicating that the second resource manager 145 can successfully participate in the transaction. It should be understood, that if the second resource manager 145 cannot successfully participate, it should roll back any updates it performed and send a rollback response.

The transaction coordinator 120 collects the responses and force writes 265 a fourth log record to its log 125, wherein the fourth log record comprises the transaction identifier and a computed decision associated with the transaction. Assuming that all resource managers responded that they can commit, the decision is commit. If one or more resource managers responded that they have rolled back, the decision is rollback.

Next, the transaction coordinator 120 flows a decision (e.g. commit request 270) to the first resource manager 135 and a commit request 275 to the second resource manager 145, indicating to the resource managers that they should commit the transaction.

After, the transaction has been committed (or rolled back, depending on the decision), the transaction coordinator and resource managers "forget" the transaction, resulting in associated log records becoming eligible for purging.

In the event of a resource manager failing to respond in a timely manner to the prepare request or to a commit or rollback request (e.g. due to the resource manager failing; the communication channel between the transaction coordinator and the resource manager failing or the like), the transaction coordinator can attempt to re-establish contact with the resource manager.

The re-establishment process is relatively costly in itself, but has additional problems when resource managers are grouped and freely interchangeable because, for example, standard mechanisms (e.g. XA protocol) by which a transaction coordinator communicates with a resource manager do not provide a mechanism to enable the transaction coordinator to find out which resource manager it is connected to. Thus, the only information available to the transaction coordinator as it tries to re-establish a connection to a resource manager is the information used by the transaction coordinator to connect in the first instance e.g. host and port information associated with a resource manager; group name associated with the group of resource managers (note that a particular resource manager within the group is not identifiable). This means that the transaction coordinator may not reconnect to the resource manager that actually failed.

Another aspect of typical mechanisms (e.g. XA protocol) can make the situation still worse.

If communication is re-established with one of the resource managers in the group, the transaction coordinator is configured to obtain a list of the transactions which the resource manager believes to be "in doubt"—note that a resource manager can be involved in transactions coordinated by other transaction coordinators at the same time.

In response to receipt of the list, the transaction coordinator compares the list with its own list of in doubt transactions.

If the transaction coordinator finds a matching transaction identifier, it asks the resource manager to resolve the associated transaction in accordance with the decisions logged by the transaction coordinator. Subsequently, the transaction coordinator forgets about the transaction and the transaction's state e.g. the transaction coordinator removes the transaction from its list of in doubt transactions (thus freeing up the resources (e.g. storage) it uses to retain information about the transaction).

If the resource manager does not list a transaction which the transaction coordinator believes to be in doubt, the transaction coordinator presumes that the transaction has been resolved correctly by the resource manager and subsequently forgets the transaction.

The combination of the factors described above can cause further problems as the transaction coordinator may prematurely forget a transaction.

For example, an unresolvable transaction can result if a transaction coordinator, initially connected to resource manager RM_1 and upon failure of RM_1, re-connects to a second resource manager, RM_2, in the same interchangeable group of resource managers.

If RM_2 does not report transaction T_1 (which is in doubt on RM_1) when asked for the list of in-doubt transactions, the transaction coordinator will presume that it has been resolved correctly and forget it. Upon re-connecting to the original resource manager, RM_1, at a later time, the transaction coordinator cannot provide the resolution decision and the transaction is left in doubt on RM_1.

Some transaction coordinators can use a transaction identifier to determine if a transaction was originated by them even if it has been forgotten—if this feature is used, the transaction coordinator provides a rollback decision.

Although this overcomes the problem of an unresolvable transaction on RM_1, it can result in data loss as will be described below.

Consider the following sequence of events:

1. Transaction T_1 involving updates on both RM_1 and RM_3 is prepared and so is in doubt;
2. The transaction coordinator logs its intention to commit and attempts to provide RM_1 with a commit decision but RM_1 fails before it can action the request;
3. The transaction coordinator attempts to re-establish contact with RM_1 but is reconnected to RM_2 instead;
4. The transaction coordinator, assuming it has reconnected to RM_1, asks RM_2 for its in-doubt transactions—RM_2 does not report T_1 in the list;
5. The transaction coordinator assumes that the first commit decision was indeed received by RM_1 but that the transaction coordinator did not get confirmation that the transaction was completed before contact was lost;
6. The transaction coordinator provides the commit decision to RM_3 and then discards information about T_1 believing that the transaction has been resolved successfully;
7. At a later date, the transaction coordinator reconnects to RM_1 and asks it for its list of in-doubt transactions—RM_1 reports T_1 as in doubt;
8. The transaction coordinator uses the transaction identifier to identify that the transaction is one that the transaction coordinator should know about. Subsequently, the transaction coordinator presumes rollback and instructs RM_1 to rollback.

However, in this scenario a commit decision is provided to RM_3 but a rollback decision is later provided to RM_1.

This is clearly unacceptable in a system designed to ensure transaction integrity for business-critical systems.

A known solution to this problem is changing the communication mechanism such that the transaction coordinator, upon connection, asks a resource manager for its identifier. The transaction coordinator stores the identifier and upon re-connection, uses the identifier to check whether it has connected to the identified resource manager. If the transaction coordinator has not connected to the identified resource manager, it disconnects and upon reconnection, rechecks whether it has connected to the identified resource manager. Once the transaction coordinator has connected to the identified resource manager, the transaction coordinator attempts to resolve the transaction.

Although this solution goes some way to solving the problems associated with data-loss and unresolvable transactions, it also has some disadvantages.

For example, it does not address a requirement that the transaction coordinator should be able to resolve a transaction as quickly as possible—this is because a) the reconnection retry mechanism described above takes time and b) the transaction coordinator must wait until the failed resource manager is active in order to successfully reconnect to it which may take a long time if the failure is serious and complex.

Furthermore, because the transaction coordinator cannot forget the transaction until it has been resolved, the transaction coordinator cannot make available the resources (e.g. storage) it uses to retain information about the transaction.

Furthermore, use of the solution above requires significant changes to each transaction coordinator and each resource manager in the system in order to correctly support the changed protocol—this is obviously an enormous administrative burden in a system where there could be huge numbers of transactional components. This task is also time-consuming and complex.

The requirements above are important for overall system performance and business effectiveness but also in environments where a high volume of less complex transactions (e.g. micro payments) is required.

Figure 3:
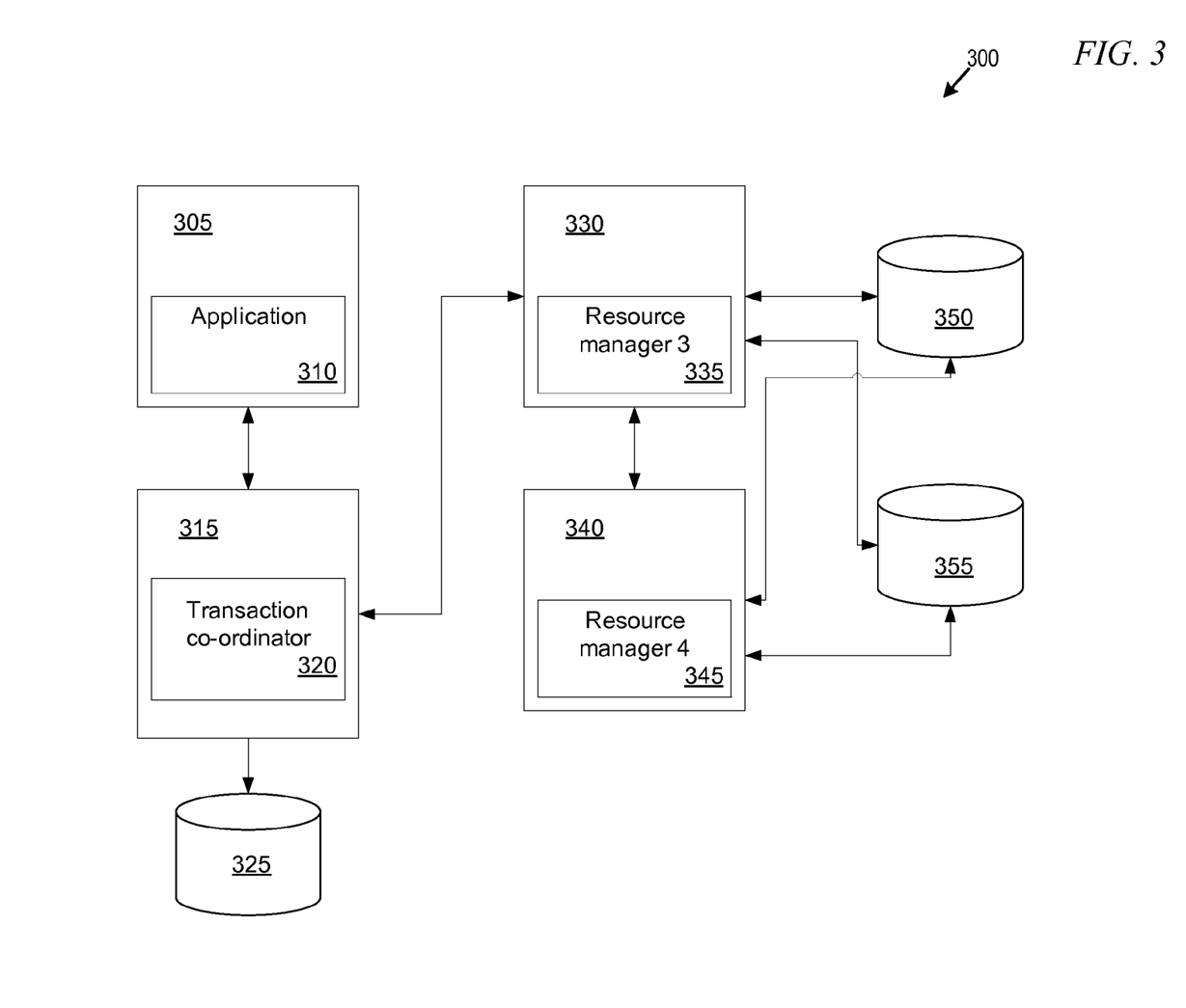
FIG. 3 is a block diagram of a transaction processing system according to the preferred embodiment.

A transaction processing system 300 according to the preferred embodiment will now be described with reference to FIG. 3.

The system 300 comprises a fifth data processing system 305 comprises an owning application 310 and a sixth data processing system 315 comprising a transaction coordinator 320 having a first log 325.

The system 300 also comprises a seventh data processing system 330 comprising a third resource manager 335 for managing a third resource and an eighth data processing system 340 comprising a fourth resource manager 345 for managing a fourth resource.

Each of the resource managers comprises an associated log 350 and 355 and each of the resource managers is modified to access the other resource manager and to access the other resource manager's log.

Preferably, the resource managers can be grouped and are freely interchangeable. Preferably, a single resource manager does work under a particular transaction—however, the single resource manager can be replaced by another resource manager in the group to do work under the transaction.

The transaction coordinator 320 is modified to be able to connect to any one of the resource managers.

Figure 4:
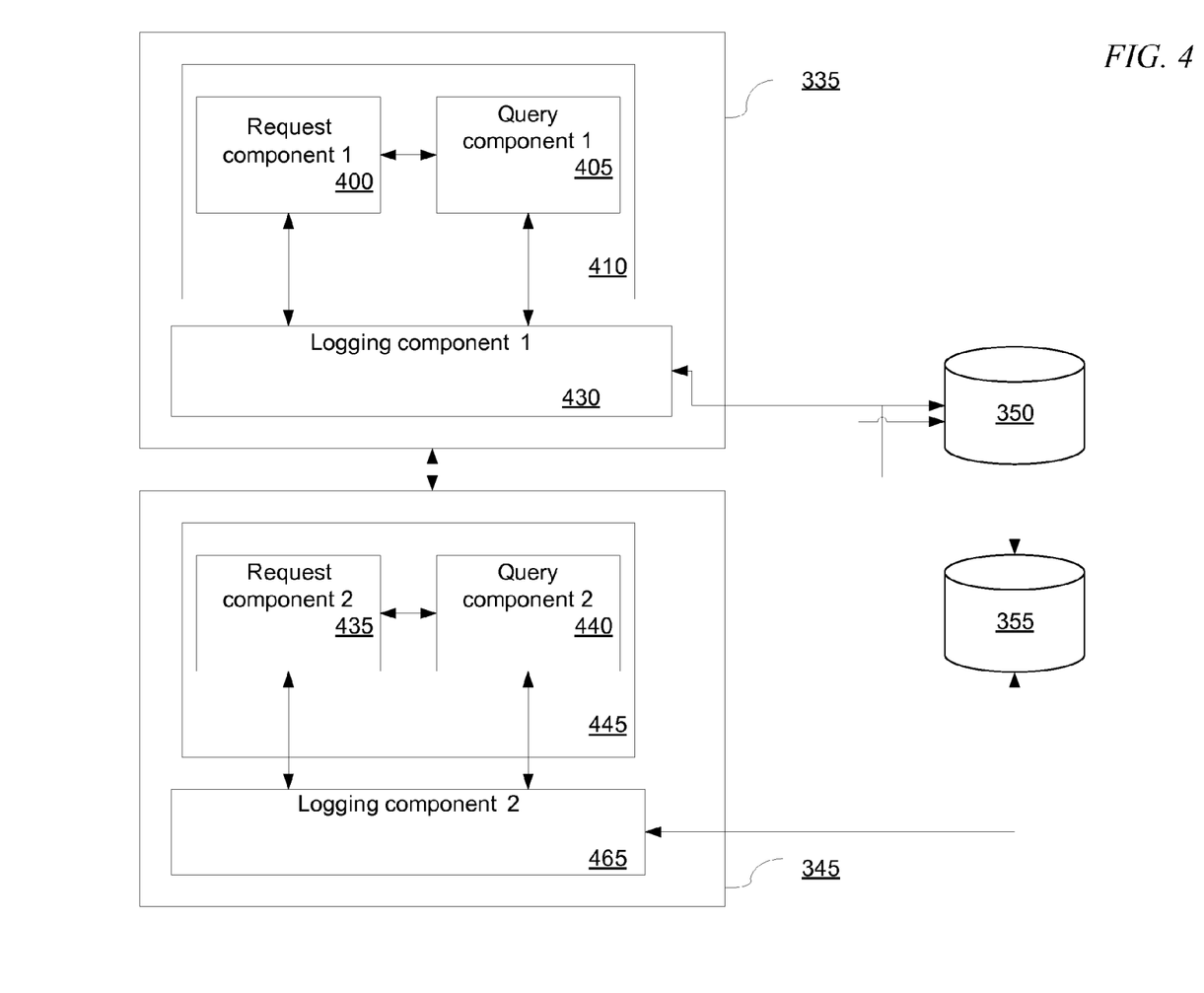
FIG. 4 is a block diagram of a resource manager of the system in FIG. 3 according to the preferred embodiment.

A resource manager according to the preferred embodiment is shown in more detail in FIG. 4.

Each of the resource managers 335 and 345 comprises: a recovery component 410 and 445 having a request component 400 and 435 operable to perform read operations and a query component 405 and 440 operable to perform read operations; and a logging component 430 and 465 operable to access a log that is associated with the resource manager as well as a log that is associated with the other resource manager.

Figure 5:
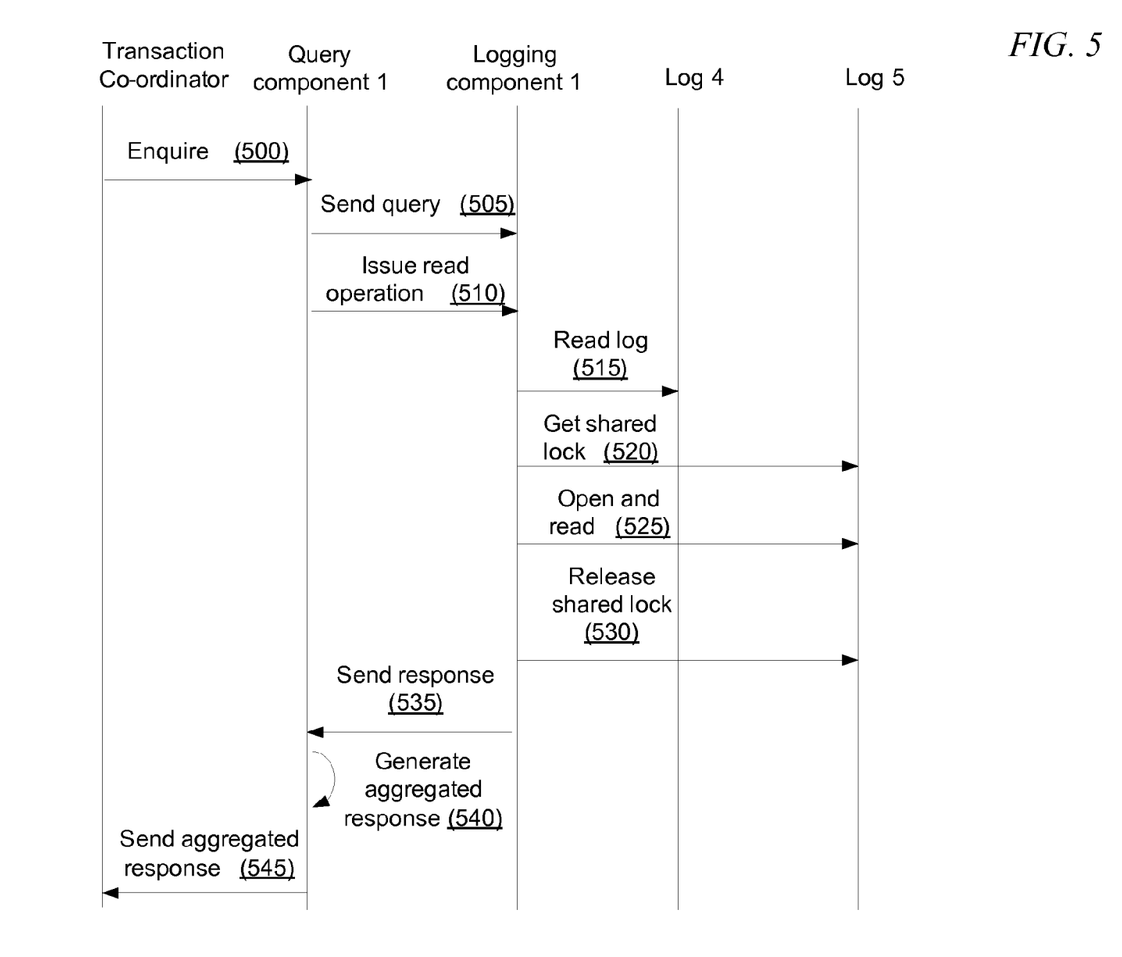
FIG. 5 is a flow chart showing the operational steps involved in a first transaction processing process.

A first process according to the preferred embodiment will be described with reference to FIG. 5, wherein prior to processing, a failure occurs and the transaction is in doubt, e.g. a failure associated with communications between the transaction coordinator 320 and a resource manager; a failure associated with the resource manager.

The transaction coordinator 320 attempts to reconnect to a resource manager in the group of freely interchangeable resource managers in order to resolve the transaction.

At step 500, in the example, the transaction coordinator 320 connects to a first query component 405 of the third resource manager 335 and sends a query requesting a list of in doubt transactions.

At step 505, the first query component 405 passes the query to the first logging component 430.

For each other resource manager in the group (namely, in the example, the fourth resource manager 345), the first query component 405 determines whether the each other resource manager in the group is active e.g. using an operating facility which tracks the status of a resource manager, using a heartbeat mechanism (and retaining a determined status in a data structure).

At step 510, for each other resource manager in the group that is inactive (namely, in the example, the fourth resource manager 345), the first query component 405 issues, to the first logging component 430, a read operation to read the log associated with the inactive resource manager.

Responsive to receiving the query sent at step 505, at step 515, the first logging component 430 accesses a fourth log 350 associated with the third resource manager 335. In the example, the logging component 430 determines from the fourth log 350 that there is one in doubt transaction having an identifier of T_1. Note that the reading of a log can be executed in a number of ways, e.g. wherein a log is read from start to finish, wherein a checkpoint is used in a log to record a current state of a resource manager, the logging component 430 records a checkpoint and reads any log records subsequently recorded.

Responsive to receiving the read operation at step 510, at step 520, the first logging component 430 obtains a shared lock on the fifth log 355 associated with the fourth resource manager 340.

Note that shared locks are temporary and are acquired only when needed.

Note also that the use of shared locks allows for concurrent access to the log by other resource managers in the group. Importantly, this allows the group of resource managers to retain flexibility and load balancing functionality.

In response, the first logging component 430 accesses, opens and reads (step 525) the fifth log 355. Note that this is a more involved process than simply reading a "local" log (e.g. the fourth log 350)

After reading the fifth log 355, the first logging component 430 closes the fifth log 355.

In the example, the logging component 430 determines from the fifth log 355 that there is one in doubt transaction having an identifier of T_2.

Note that advantageously, even though the fourth resource manager 345 is inactive and the transaction is in doubt, the third resource manager 335 can access the fifth log 355 of the fourth resource manager 345 in order to aid resolution of the transaction.

At step 530, the first logging component 430 releases the shared lock.

Note that shared lock is released when not required and therefore is not acquired for long periods of time.

At step 535, the first logging component 430 sends the results of the read operations of steps 515 and 525 to the first query component 405, each result comprising the transaction identifier of an in doubt transaction Note that if there were more than one inactive resource manager in the group, the first logging component 430 is operable to repeat steps 525, 530, and 535 for each inactive resource manager.

Furthermore, note that the first logging component 430 is operable to receive a list of in doubt transactions from active resource managers in the group also (e.g. wherein a first request component 400 issues a read operation and responsively, the first logging component 430 makes a call to the active resource managers).

Note also that transaction identifiers of transactions that are in doubt and are being coordinated by other transaction coordinators can also be received by the first logging component 430.

Note also that advantageously, the steps associated with obtaining a list of in doubt transactions can be carried out by more than one resource manager in the group—that is, concurrent access to any resource manager's log in the group is possible because the group are inter-connected and because shared locks can be obtained.

Responsively, at step 540, the first query component 405 aggregates each result received into a response and sends (step 545) the aggregated response to the transaction coordinator 320.

The transaction coordinator 320 compares the results in the response received with its log in order to determine whether any of the transaction identifiers received matches transaction identifiers of in doubt transactions that it has logged.

For example, the transaction coordinator 320 compares a transaction identifier (e.g. T_2) with its log and in response to determining that it has also logged T_2, the transaction coordinator 320 reads the associated entry in the log in order to determine a decision.

Advantageously, according to the preferred embodiment, a complete list of in doubt transactions associated with each resource manager in the group can be collated and provided to the transaction coordinator 320.

Advantageously, according to the preferred embodiment, in the event of an in doubt transaction, a transaction coordinator is able to quickly confirm its understanding of the state of such a transaction even if a resource manager has failed (e.g. because the transaction is not in doubt for a large period of time due to an active resource manager being able to read the logs of the failed resource manager).

Furthermore, because the transaction coordinator does not prematurely forget a transaction, the transaction can be resolved without data loss.

Furthermore, the preferred embodiment does not require significant changes to the transaction processing system (the preferred embodiment requires no changes to the normal transaction processing path—the only change required is the reaction of a resource manager to being asked to list the transactions it believes are in doubt).

Furthermore, according to the preferred embodiment, an in doubt transaction can be resolved regardless of the "entry point" (i.e. the particular resource manager a transaction coordinator connects to) of a transaction coordinator to a group of resource managers.

Furthermore, the preferred embodiment is relatively lightweight and flexible in that a lock is preferably obtained as late on in the process as possible and is released as early on in the process as possible.

Figure 6:
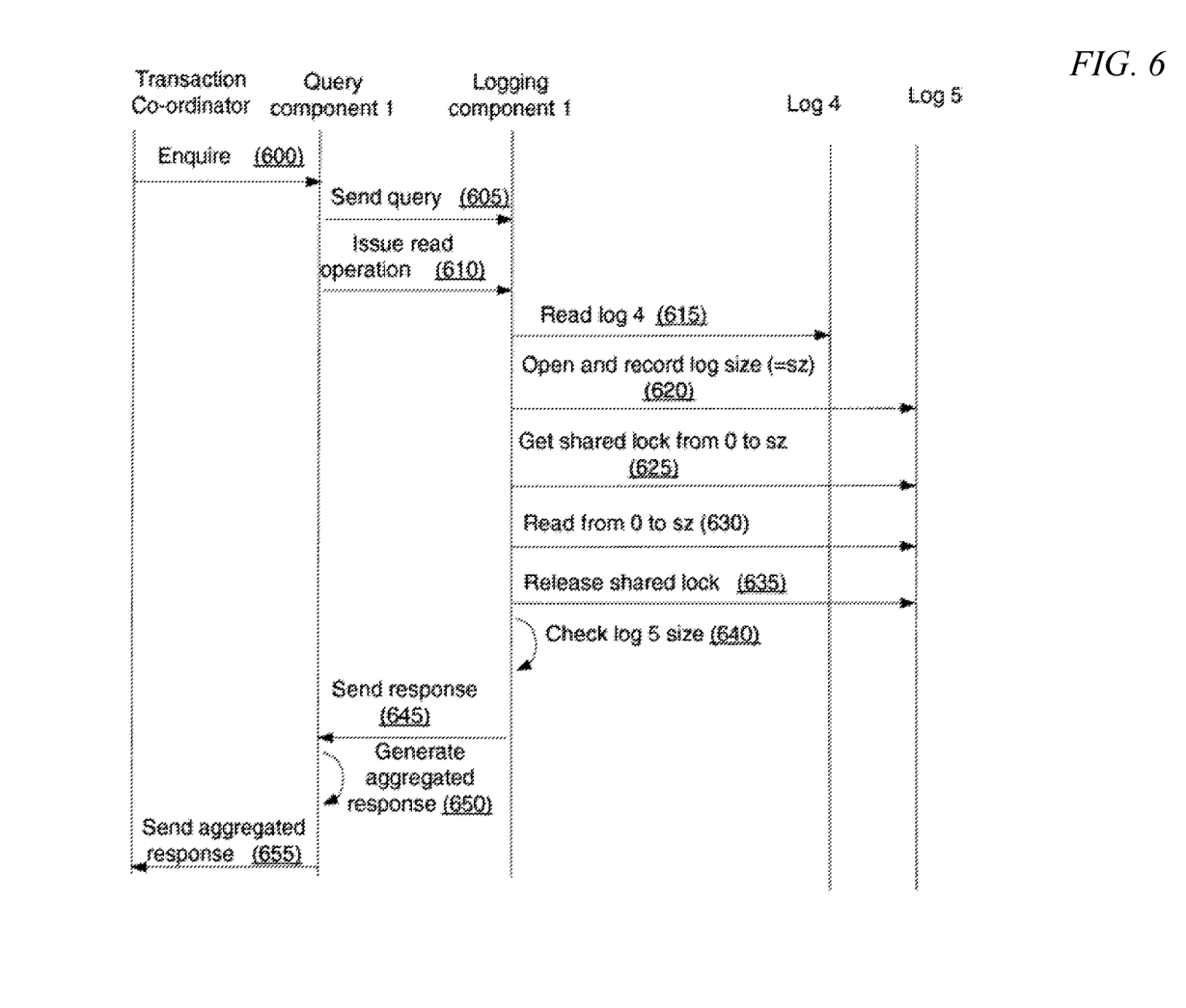
FIG. 6 is a flow chart showing the operational steps involved in a second transaction processing process.

A second process according to the preferred embodiment will be described with reference to FIG. 6, wherein prior to processing, a failure occurs and the transaction is in doubt as a result of, e.g., a failure associated with communications between the transaction coordinator 320 and a resource manager, a failure associated with the resource manager, or the like.

The transaction coordinator 320 attempts to reconnect to a resource manager in the group of freely interchangeable resource managers in order to resolve the transaction.

At step 600, in the example, the transaction coordinator 320 connects to a first query component 405 of the third resource manager 335 and sends a query requesting a list of in doubt transactions.

At step 605, the first query component 405 passes the query to the first logging component 430.

For each other resource manager in the group (namely, in the example, the fourth resource manager 345), the first query component 405 determines whether the each other resource manager in the group is active.

At step 610, for each other resource manager in the group that is inactive (namely, in the example, the fourth resource manager 345), the first query component 405 issues, to the first logging component 430, a read operation to read the log associated with the inactive resource manager.

Responsive to receiving the query sent at step 605, at step 615, the first logging component 430 accesses the fourth log 350 and determines from the fourth log 350 that there is one in doubt transaction having an identifier of T_1.

Responsive to receiving the read operation at step 610, at step 620, the first logging component 430 opens the fifth log 355 and determines the size of the fifth log 355.

In the example herein, the size has a value "sz".

At step 625, the first logging component 430 obtains a shared lock to a subset of the fifth log 355, namely, from the start of the fifth log 355 up to a location associated with sz. Advantageously, a lock associated with sz of the log can be used to obtain a consistent set of transaction states as of the time that the lock was obtained.

In response, the first logging component 430 accesses and reads (step 630) the fifth log 355 from the start of the fifth log 355 up to a location associated with sz.

After reading the fifth log 355, the first logging component 430 closes the fifth log 355.

In the example, the logging component 430 determines from the fifth log 355 that there is one in doubt transaction having an identifier of T_2.

At step 635, the first logging component 430 releases the shared lock.

At step 640, the first logging component 430 re-checks the size of the fifth log 355—this step is preferably required because in the time period between the execution of step 620 and step 635, the fifth log 355 may have changed (e.g. due to an update from another resource manager in the group that can also access the fifth log 355).

If the first logging component 430 determines that the value of sz has changed, steps 625, 630, and 635 are repeated (until there is no further change in sz).

An optimization is to modify the first logging component 430 to obtain a shared lock to and read only the changed subsets of the fifth log 355).

Control subsequently passes to step 645.

If the first logging component 430 determines that the value of sz has not changed, control passes directly to step 645.

Note that if there is more than one inactive resource manager in the group, the first logging component 430 is operable to repeat steps 620 to 640 for each inactive resource manager.

Note also that the first logging component 430 is operable to receive a list of in doubt transactions from active resource managers in the group; is operable to receive transaction identifiers of transactions that are in doubt and are being coordinated by other transaction coordinators; and that the steps associated with obtaining a list of in doubt transactions can be carried out by more than one resource manager.

At step 645, the first logging component 430 sends the results of the read operations of steps 615 and 630 to the first query component 405, each result comprising the transaction identifier of an in doubt transaction.

Responsively, at step 650, the first query component 405 aggregates each result received into a response and sends (step 655) the aggregated response to the transaction coordinator 320.

Advantageously, the second process can be used in environments where it is possible to obtain a shared lock to a selected subset (or "range") of a log, leaving the remainder of the log(including, for example, subsets which do not yet exist) un-locked. Advantageously, this allows for flexibility in that the un-locked ranges of the log can still be used.

It will be clear to one of ordinary skill in the art that all or part of the method of the preferred embodiments of the present invention may suitably and usefully be embodied in a logic apparatus, or a plurality of logic apparatus, comprising logic elements arranged to perform the steps of the method and that such logic elements may comprise hardware components, firmware components or a combination thereof.

It will be equally clear to one of skill in the art that all or part of a logic arrangement according to the preferred embodiments of the present invention may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

It will be appreciated that the method and arrangement described above may also suitably be carried out fully or partially in software running on one or more processors (not shown in the Figures), and that the software may be provided in the form of one or more computer program elements carried on any suitable data-carrier (also not shown in the Figures) such as a magnetic or optical disk or the like. Channels for the transmission of data may likewise comprise storage media of all descriptions as well as signal-carrying media, such as wired or wireless signal-carrying media.

The present invention may further suitably be embodied as a computer program product for use with a computer system. Such an implementation may comprise a series of computer-readable instructions either fixed on a tangible medium, such as a computer readable medium, for example, diskette, CD-ROM, ROM, or hard disk, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

In an alternative, the preferred embodiment of the present invention may be realized in the form of computer implemented method of deploying a service comprising steps of deploying computer program code operable to, when deployed into a computer infrastructure and executed thereon, cause the computer system to perform all the steps of the described method. It will be clear to one skilled in the art that many improvements and modifications can be made to the foregoing exemplary embodiment without departing from the scope of the present invention.

What is claimed is:

1. A computer implemented method for determining a state associated with a transaction for use with a transactional processing system comprising a transaction coordinator and a plurality of grouped and inter-connected resource managers, the computer implemented method comprising
    responsive to a communications failure between the transaction coordinator and a first resource manager causing a transaction to have an in-doubt state, connecting to a second resource manager;
    responsive to connecting, sending by the transaction coordinator to the second resource manager, a query requesting data associated with an in-doubt transaction;
    determining a size associated with a subset of a first log associated with the first resource manager, and subsequently, obtaining at the first resource manager, by the second resource manager, a shared lock to data associated with the in-doubt transaction, wherein the obtaining further comprises obtaining a shared lock to the subset; and
    responsive to obtaining, collating, by the second resource manager, data associated with the in-doubt transaction associated with the first resource manager;
    determining whether the size associated with the subset has changed;
    responsive to determining that the size has not changed, transmitting the data associated with the in-doubt transaction associated with the first resource manager to the transaction coordinator; and
    responsive to determining that the size has changed, re-obtaining a shared lock to the subset;
    collating, by the second resource manager, data associated with the in-doubt transaction associated with the first resource manager; and responsively, releasing the shared lock.

2. The computer implemented method as claimed in claim 1, further:
    determining, prior to obtaining, whether the first resource manager is active.

3. The computer implemented method of claim 1, wherein collating, by the second resource manager, data associated with the in-doubt transaction associated with the first resource manager further comprises:
    reading the first log associated with the first resource manager.

4. The computer implemented method of claim 1, further comprising:
    in response to collating, by the second resource manager, data associated with the in-doubt transaction associated with the first resource manager, releasing the shared lock.

5. The computer implemented method of claim 1, further comprising:
    responsive to sending, collating, by the second resource manager, data associated with an in-doubt transaction associated with each other resource manager in the group.

6. The computer implemented method of claim 1, further comprising:
    transmitting collated data associated with one or more in-doubt transactions to the transaction coordinator.

7. The computer implemented method of claim 1, wherein collating data, by the second resource manager, forms received collated data, further comprising:
    using, by the transaction coordinator, the received collated data in order to determine a transaction resolution.

8. A computer implemented method for determining a state associated with a transaction for use with a transactional processing system comprising a transaction coordinator and a plurality of grouped and inter-connected resource managers, the computer implemented method comprising:
    responsive to a communications failure between the transaction coordinator and a first resource manager causing a transaction to have an in-doubt state, connecting to a second resource manager;
    responsive to connecting, sending by the transaction coordinator to the second resource manager, a query requesting data associated with an in-doubt transaction;
    responsive to sending, collating, by the second resource manager, data associated with the in-doubt transaction associated with the second resource manager;
    determining a size associated with a subset of a first log associated with the first resource manager, and subsequently, obtaining at the first resource manager, by the second resource manager, a shared lock to data associated with the in-doubt transaction, wherein the obtaining further comprises obtaining a shared lock to the subset; and responsive to obtaining, collating, by the second resource manager, data associated with the in-doubt transaction associated with the first resource manager.

9. A hardware apparatus for determining a state associated with a transaction comprising a transaction coordinator and a plurality of grouped and inter-connected resource managers, the apparatus comprising:

means, responsive to a communications failure between the transaction coordinator and a first resource manager causing a transaction to have an in-doubt state, for connecting to a second resource manager;

means, responsive to the connection means, for causing the transaction coordinator to send to the second resource manager, a query requesting data associated with the in-doubt transaction;

means for determining a size associated with a subset of a first log associated with the first resource manager;

means for causing the second resource manager, subsequent to determining a size associated with a subset of a first log associated with the first resource manager, to obtain, at the first resource manager, a shared lock to data associated with the in-doubt transaction; and means, responsive to the obtaining means, for causing the second resource manager to collate data associated with the in-doubt transaction associated with the first resource manager;

means, responsive to determining that the size has not changed for transmitting the data associated with the in-doubt transaction associated with the first resource manager to the transaction coordinator; and means, responsive to determining that the size has changed for re-obtaining a shared lock to the subset;

means for collating, by the second resource manager, data associated with the in-doubt transaction associated with the first resource manager; and responsively, releasing the shared lock.

* * * * *